United States Patent [19]

Chase

[11] Patent Number: 5,636,906
[45] Date of Patent: Jun. 10, 1997

[54] CHROMIUM-PLATED COMPOSITE WHEEL

[75] Inventor: Lee A. Chase, Ada, Mich.

[73] Assignee: Lacks Industries, Inc., Grand Rapids, Mich.

[21] Appl. No.: 412,619

[22] Filed: Mar. 29, 1995

Related U.S. Application Data

[63] Continuation of Ser. No. 904,180, Jun. 25, 1992, abandoned.

[51] Int. Cl.$^6$ ................................................. B60B 7/06
[52] U.S. Cl. .......................... 301/37.43; 301/37.37; 301/37.27; 301/37.42
[58] Field of Search ........................ 301/37.1, 37.37, 301/37.42, 37.43, 64.2, 64.4, 108.1, 108.4, 37.27

[56]           References Cited

U.S. PATENT DOCUMENTS

| | | | |
|---|---|---|---|
| 1,858,228 | 5/1932 | Zyon | 301/37.1 |
| 2,091,602 | 8/1937 | Le Jeune | 301/6 WB |
| 2,226,511 | 12/1940 | Hollerith | 301/37.1 |
| 2,973,226 | 2/1961 | Ellies | 301/37 P |
| 3,669,501 | 6/1972 | Derleth | 301/37 R |
| 3,726,566 | 4/1973 | Beith | 301/37.1 |
| 3,915,502 | 10/1975 | Connell | 301/37 R |
| 3,918,762 | 11/1975 | Hampshire | 301/63 PW X |
| 4,416,926 | 11/1983 | Maglio | 428/31 |
| 4,511,183 | 4/1985 | Spiegel et al. | 301/37 S |
| 4,606,582 | 8/1986 | Warren | 301/108 S X |
| 4,659,148 | 4/1987 | Grill | 301/37 P |
| 4,682,820 | 7/1987 | Stalter | 301/37 P |
| 5,031,966 | 7/1991 | Oakey | 301/37 R X |
| 5,128,085 | 7/1992 | Post et al. | 301/37 P X |
| 5,143,426 | 9/1992 | Todd | 301/37 P |
| 5,368,370 | 11/1994 | Beam | 301/37.36 |
| 5,458,401 | 10/1995 | Baccman | 301/37.43 |

FOREIGN PATENT DOCUMENTS

| | | | |
|---|---|---|---|
| 2813412 | 10/1979 | Germany. | |
| 2848790 | 5/1980 | Germany. | |
| 0069302 | 6/1978 | Japan | 301/37 R |

Primary Examiner—Russell D. Stormer
Attorney, Agent, or Firm—Remy J. VanOphem; Thomas A. Meehan; John VanOphem

[57]           ABSTRACT

A composite vehicle wheel having a disk, a rim circumscribing the disk, and an ornamental metal-plated plastic overlay attached to the outboard surface of the disk. The overlay has a pair of oppositely disposed surfaces which form interior and exterior surfaces of the overlay. The interior surface mates with at least a portion of the outboard surface of the wheel while the exterior surface has a metal layer plated thereon. The overlay is formed from a relatively thin plastic panel such that the exterior surface uniformly and closely conforms to the outboard surface of the wheel and the metal layer is substantially flush with the adjacent portions of the outboard surface to provide a pleasing aesthetic effect to the wheel. The integrity of the metal layer is such that the overlay successfully meets corrosion resistance requirements for automobile manufacturers' original equipment.

16 Claims, 3 Drawing Sheets

CHROMIUM-PLATED COMPOSITE WHEEL

This is a continuation, of application Ser. No. 07/904, 180, filed Jun. 25, 1992 now abandoned.

BACKGROUND OF THE INVENTION

1. Field of the Invention

The present invention generally relates to metal-plated automobile wheels. More specifically, this invention relates to a composite automobile wheel having a permanently attached metal-plated overlay which is formed from a high impact plastic and whose bond strength with the metal plating permits the overlay to be shaped and contoured to closely conform to the shape of the wheel without concern for the deleterious effects of heat and corrosion on the high impact plastic or the integrity of the metal plating bond.

2. Description of the Prior Art

Motor vehicles often include substantial amounts of metal-plated trim elements which provide both decorative and functional purposes. In particular, chrome-plated aluminum wheels have been very popular since the time chromium plating was first introduced, and have recently become particularly fashionable with both sports cars and prestigious automobiles. Chrome-plated wheels are often significantly contoured to enhance their effect on the overall appearance of the vehicle by exploiting the highly reflective nature of the chromium surface.

However, automobile manufacturers have not generally provided chrome-plated cast aluminum wheels as original equipment on their automobiles because the porosity of the cast aluminum makes such wheels very difficult to plate. Moreover, the porosity of cast aluminum wheels results in a somewhat porous chromium plate layer which generally exhibits poor corrosion resistance to the wheel, causing the chromium plating to be susceptible to corrosion. Specifically, it is well known in the art that chrome-plated cast aluminum wheels have been unable to pass the automobile manufacturers' corrosion tests due to the inability of the copper-nickel-chrome layer to effectively cover the porous aluminum cast wheel. As a result, chrome-plated cast aluminum wheels have been provided to the public exclusively by aftermarket suppliers who adapt expensive plating techniques to attempt to solve this problem with limited success.

To obtain better plating results, current plating practices generally entail plating only machined surfaces of a cast aluminum wheel, the machining being intended to "close" the pores in the cast aluminum surface to promote a better subsurface to which the chromium may be plated. However, this approach severely limits the surfaces of a cast aluminum wheel which can be chrome-plated since known machining techniques are incapable adequately machining deep recesses in cast aluminum wheels, such as the turbine openings formed in "spoke" wheels. Nevertheless, the entire wheel is often chrome-plated, resulting in poor adherence on surfaces which were not machined or inadequately machined, leaving these areas highly susceptible to delamination and corrosion. Chromium plating the entire wheel also incurs up to three pounds of additional weight, which detracts from the weight advantage of cast aluminum wheels.

In addition to the adverse effects of porosity and resulting corrosion, the adhesive strength of a chromium plating must be sufficient to endure deformation of the wheel as the automobile is driven down the road, or when the automobile is involved in a collision, or strikes road debris, roadway abutments or the like. Such hazards further challenge the ability of the chromium to adhere to the wheel without cracking or delamination. One known approach to avoiding this threat is to provide an ornamental wheel cover which is attached to the wheel so as to partially isolate the wheel cover from wheel deflections. U.S. Pat. No. 3,915,502 to Connell adopts this approach, providing an annular-shaped wheel cover that is permanently attached with double-sided adhesive tape to the wheel midway between the rim and the center hub area of the wheel. The remainder of the wheel cover is spaced apart from the outboard surface of the wheel, presumably to avoid the deleterious effects of heat generated by the tire, the wheel and the brake. However, Connell teaches nothing toward improving the subsurface of a metal-plating to the wheel cover such that the metal-plating might survive an automobile manufacturer's corrosion tests. In addition, the bulky structure taught by Connell almost completely hides or obscures the styling of a wheel, thereby significantly defeating the purpose of using a cast aluminum wheel-that is, the prestigious appeal associated with its appearance.

As another substitute for directly plating wheels, it is also known in the prior art to use a plastic overlay which is bonded to the outboard surface of the wheel for purposes of appearance and aesthetics. Generally, this approach is taken to allow the wheel to be designed for structural purposes, allowing the wheel's appearance to be determined by the ornamental design of the overlay.

As taught by U.S. Pat. No. 3,669,501 to Derleth, the ornamental surface of an annular-shaped overlay is a thin plastic cover, preferably formed from acrylonitrile-butadiene-styrene (ABS), which is axially spaced away from the outboard surface of the wheel to provide a cavity between the cover and the wheel into which an adherent polyurethane foam is disposed. Derleth teaches that the polyurethane foam adhesive provides a low-density, semi-resilient reinforcement for the thin gauge plastic cover while also providing sound insulation for tire and wind noise. However, it is understood by those skilled in the art that another reason for spacing the overlay's cover from the wheel surface is to avoid the deleterious effects of heat generated by the wheel and brake which would otherwise distort this plastic cover and delaminate any metal plating applied thereto. This is particularly true in the immediate region of the wheel hub where temperatures tend to be much higher than in the remainder of the wheel. As a result, definite styling and design limitations are associated with the use of the overlay taught by Derleth. Moreover, the styling of the wheel is obscured by the overlay. In addition, Derleth does not teach an overlay with improved adhesion between the overlay and its aesthetic treatments which might successfully pass an automobile manufacturer's corrosion tests.

Another example of an overlay is taught in U.S. Pat. No. 4,416,926 to Maglio which discloses adhering a wheel cover to a wheel with a resin matrix containing hollow microspheres. Similar to the teachings of Connell and Derleth, the wheel cover taught by Maglio is also axially spaced away from the wheel to avoid the wheel's potentially high temperatures, particularly near the center of the wheel. U.S. Pat. No. 4,659,148 to Grill emphasizes this concern, teaching an overlay which is attached only to the outer regions of the wheel, while extending radially inward toward the center of the wheel a limited distance. A retainer is provided to space the overlay axially away from the center of the wheel, thus avoiding thermal conduction from the wheel center to the overlay. In contrast to Grill, U.S. Pat. No. 4,682,820 to Stalter teaches a plastic cap which completely covers but is axially spaced from the region of the wheel center. The cap relies upon an interference fit with an annular-shaped overlay to remain attached to the wheel.

In addition to their styling being significantly limited by the adverse effects of high temperatures, the ornamental plastic overlays of the above prior art all share a common disadvantage in their inability to permanently adhere a metal plating, particularly when exposed to a corrosive environment. Though the prior art fails to emphasize this aspect as a recurring problem, its existence is clear from the fact that automobile manufacturers have not to date provided chrome-plated plastic overlays as original equipment. As with the aforementioned chrome-plated wheels, metal-plated plastic overlays have been unable to pass the automobile manufacturers' corrosion tests, and therefore have been provided to the public exclusively by aftermarket suppliers.

A wide variety of platable plastics are known. For example, unmodified acrylonitrile-butadiene-styrene (ABS) has been plated to provide decorative articles such as headlamp surrounds, and plumbing and marine hardware. Unmodified polycarbonate (PC) has been utilized as the substrate for plated motor vehicle door handles. In addition, several other plastics have been successfully plated for various decorative purposes. However, these plastics, even though platable, do not provide a satisfactory substrate if the finished article must be capable of sustaining significant impacts or temperatures. Accordingly, the use of these materials within automobile is limited. These plated plastics are characterized by a tendency to fail at low energy levels of impact, resulting in the delamination of the chromium plating from its plastic substrate. In addition, as an extreme example, the unmodified ABS may even shatter upon impact. Thus, for a plastic to be suitable as a substrate for a metal-plated wheel cover or overlay, the adhesion between the plating and the substrate must generally have sufficient impact resistance, as well as temperature and corrosion resistance.

From the above discussion, it can be readily appreciated that the prior art does not disclose a metal-plated cast aluminum wheel whose metal plating is provided uniformly over the surface of the wheel, including the contours and deep recesses of the wheel, while also being capable of passing an automobile manufacturer's corrosion resistance test. In addition, the prior art does not disclose a metal-plated overlay which can be permanently adhered directly to the wheel to closely follow the contours of the wheel while also being resistant to delamination of the metal plating due to corrosion, high temperatures and impact. In effect, the design requirements of such overlays restrict the location of the overlays on the surface of the wheel, while also limiting the appearance of the overlay by requiring that the metal-plated surface be axially spaced and isolated from the outboard surface of the wheel to avoid the adverse effects of the elevated wheel temperatures. Finally, the prior art has not provided a metal-plated overlay which permits the cast aluminum wheel to define the overall styling and structural appearance of the wheel, while the overlay is specifically limited to contributing the reflective character of the wheel for purposes of aesthetics.

Accordingly, what is needed is a low-cost ornamental metal-plated overlay for an automobile wheel which can be permanently secured directly to the wheel to closely follow the contours of the wheel, without needing to insulate the metal-plated surface of the overlay from the wheel and without needing to drastically limit the location of the overlay such that the overlay is isolated from the center and periphery of the wheel. As a result, styling and design flexibility would be enhanced because the overlay would be capable of closely conforming to the contours of the entire wheel surface. As such, the wheel would be permitted to define the outward styling configuration of the wheel while the overlay provides the aesthetically-pleasing reflective appearance. In addition, a metal plating or colorful paint on such an overlay would remain securely adhered to the overlay, even when exposed to adverse physical, chemical and thermal attack.

SUMMARY OF THE INVENTION

According to the present invention there is provided a method of providing a cast aluminum wheel which has the aesthetic appearance of being metal plated, even in deep recesses in the wheel, wherein the adhesive strength of the metal plating is sufficient to pass an automobile manufacturer's corrosion resistance test. The above appearance is provided by an overlay which is characterized as being a metal-plated plastic panel which is permanently adhered directly to the surface of the wheel and closely follows the contours of the wheel, including deep recesses such as turbine openings in the wheel. The metal plating on the overlay is highly resistant to the adverse thermal environment of the wheel while also providing corrosion and impact resistance which is superior to that of the prior art. Together, the cast aluminum wheel and the metal-plated overlay form a composite metal-plated wheel that can be provided as an integral and permanent unit available as original equipment by automobile manufacturers.

The metal-plated overlay of the present invention promotes design flexibility in that the overlay is fabricated as a thin panel structure which completely and closely conforms to the contours of a wheel, including the turbine openings in the wheel. The metal-plated exterior surface of the overlay closely follows the contours of the wheel to give the appearance of being the actual surface of the cast aluminum wheel, all without concern for poor adhesion due to porosity of the cast aluminum wheel. In addition, the metal plating is highly resistant to delamination from heat such that there is no need to axially space the metal-plated exterior surface from the outboard surface of the wheel. As a result, the cast aluminum wheel's outboard surface is permitted to define the outward shape and styling of the wheel while the overlay provides the wheel's aesthetically-pleasing reflective appearance without appearing to be a separately formed overlay.

The composite metal-plated wheel of the present invention includes the typical structure of an automotive wheel, including a central disk portion, or wheel disk, and a rim which circumscribes the disk portion for retaining a tire. The overlay is a metal-plated plastic panel which is attached to the outboard surface of the disk portion. The plastic panel has a pair of oppositely disposed surfaces which form interior and exterior surfaces of the overlay. The interior surface of the overlay mates with the outboard surface of the wheel such that the exterior surface uniformly follows and conforms to the surrounding surface of the wheel surface, including any recesses in the wheel's surface. The thickness of the plastic panel can be as little as about 2 to about 4 millimeters while still providing sufficient impact strength and without concern for the adverse effects that wheel temperatures have on the metal plating.

The plastic panel is preferably formed from a polycarbonate substrate which is modified with less than about 50 percent by weight of acrylonitrile-butadiene-styrene (ABS)

and conditioned to increase the amount of exposed ABS at the exterior surface of the plastic panel. The exterior surface is then etched and electrochemically plated with a metal, such as chromium. Due to the thinness of the plastic panel, its metal-plated exterior surface can uniformly and closely follow the contours of the outboard surface of the wheel to provide a pleasing aesthetic effect to the wheel. The material composition of the plating method and the preferred plating method permit the exterior surface to be positioned in close proximity to the outboard surface of the wheel while resisting delamination of the metal plating due to heat.

According to a preferred aspect of this invention, the metal-plated overlay of the present invention provides an aesthetically pleasing, permanently attached ornamental cover to a cast aluminum wheel without the appearance of being a separately manufactured attachment to the wheel. Because the overlay conforms to the contours of the wheel, the overlay appears to be the actual outboard surface of the cast aluminum wheel. As a result, the aesthetic styling and appeal of the wheel is established by the cast aluminum wheel, whereas the overlay need only contribute the reflective surface to the wheel. Because it is permanently attached and does not appear to be an attachment to the wheel, the overlay is not prone to being stolen or accidently detached as would be other overlays or conventional wheel covers. Moreover, the wheel can be readily mounted and removed without ever having to tamper with the overlay.

In addition, the adhesion of the metal plating to the overlay is sufficient to exhibit excellent resistance to both corrosion and heat. Testing has shown that a composite wheel incorporating the overlay of the present invention can successfully pass a typical automobile manufacturer's corrosion test so as to permit its use as an original equipment item. Moreover, the adhesion between the metal plating and the plastic panel exhibits extremely good resistance to high temperatures such that the metal-plated surface need not be spaced away from the surface of the wheel, nor is there a need for an insulating layer of foam between the metal-plated surface and the wheel. Design flexibility of the composite wheel is maximized because the overlay does not pose any significant styling limitations to the wheel as a consequence of needing to design around the high temperature areas of the wheel.

Another significant advantage of the present invention is that the overlay can cover substantially the entire visible surface of the wheel, including deep recesses in the surface of the wheel, because the porosity of the cast aluminum wheel is not a factor in the adhesive strength of the metal plating. Whereas in their application due to surface porosity cast aluminum wheels of the prior art were limited as to the coverage of the metal plating or highly susceptible to corrosion and delamination, the overlay of the present invention is able to follow the contours of the wheel, even such features as turbine openings. Yet the overlay adds significantly less weight to the wheel than metal plating the wheel itself, while also being significantly less costly.

The overlays of the prior art were also unable to provide a closely conforming reflective surface because of the need to carefully provide sufficient spacing or thermal insulation between the metal plating and the surface of the wheel. In contrast, the overlay of the present invention performs well at temperatures which may occur practically anywhere on the surface of the wheel.

The teachings of the present invention are also applicable to various wheel materials and surface treatments, including steel and magnesium wheels, polished and machined aluminum wheels, textured cast aluminum wheels and painted aluminum wheels. The surface condition of the wheel is not critical as long as an adhesive can form a sufficient bond between the wheel and the overlay.

Accordingly, it is an object of the present invention to provide an ornamental overlay for a cast aluminum wheel in which the overlay closely conforms to the contours of the wheel, such that the aesthetic styling of the wheel is provided by the cast aluminum wheel while the overlay contributes the reflective surface effect to the wheel.

It is a further object of the invention that the overlay provide maximum styling and design flexibility as to the locations on the wheel where the overlay can be secured.

It is still a further object of the invention that the overlay be capable of being permanently secured to the surface of the wheel so as to provide a composite wheel which does not have the appearance of being an assembly of two separately manufactured components.

It is another object of the invention that the overlay be formed from a suitable material which is both heat and impact resistant, and which can permanently adhere a metal plating.

It is yet another object of the invention that the overlay can be formed from a thin panel without the need to space or insulate the overlay from the wheel to avoid the adverse effects of high temperatures on the integrity of the ornamental surface.

It is still another object of the invention that the composite wheel formed with the overlay be suitably reliable in terms of corrosion resistance to be capable of being provided as an original equipment item by automobile manufacturers.

Other objects and advantages of this invention will be more apparent after a reading of the following detailed description taken in conjunction with the drawings provided.

DETAILED DESCRIPTION OF THE PREFERRED EMBODIMENT

Figure 1:
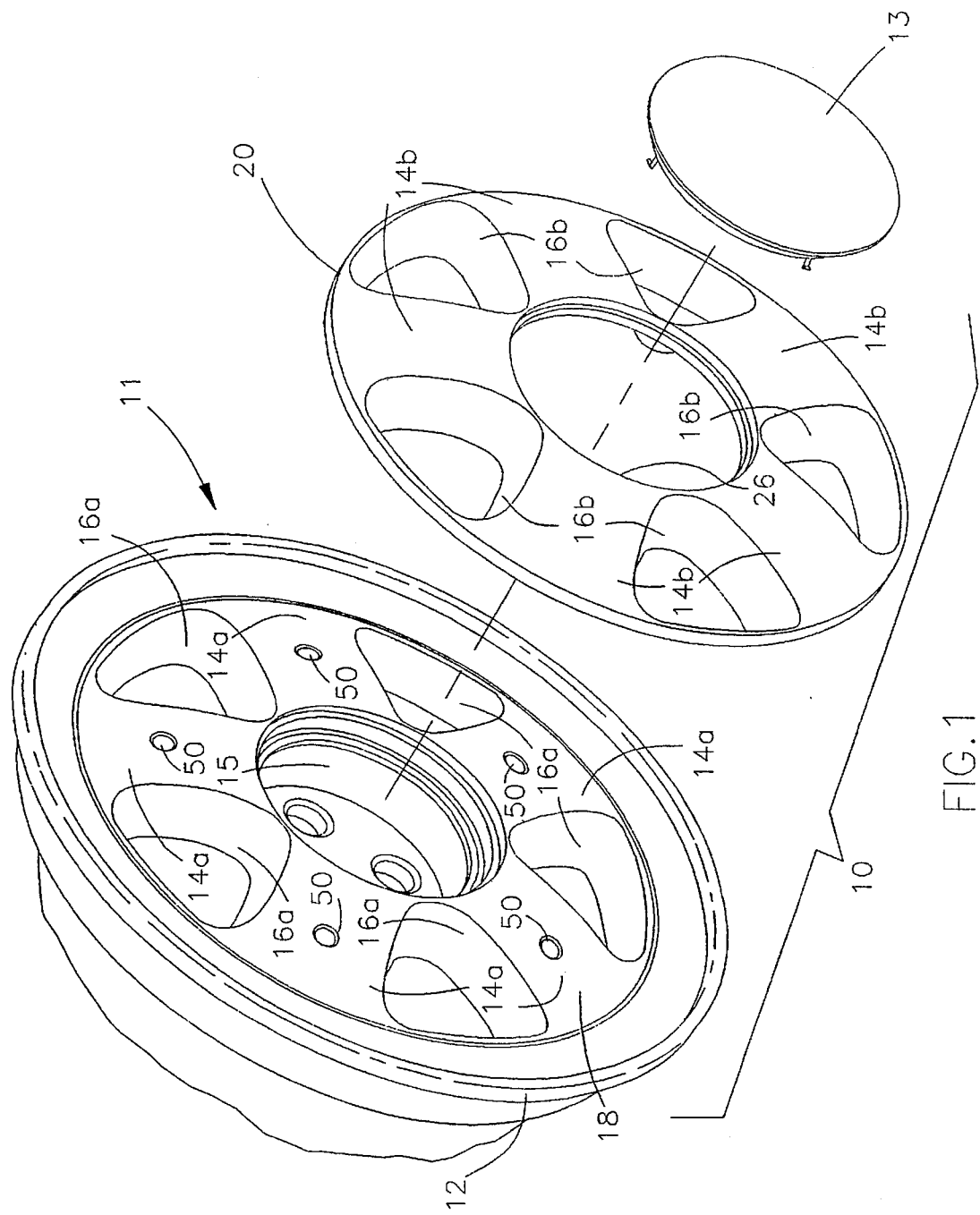
FIG. 1 is an exploded view of a composite wheel for an automobile, including a hub cover and a metal-plated overlay in accordance with the preferred embodiment of this invention.

With reference to FIG. 1, there is shown an exploded view of a composite wheel 10 for an automobile. The wheel 11 of the composite wheel 10 includes a wheel disk 18 which defines an outboard surface of the composite wheel 10, a peripheral rim portion or rim 12 with a peripheral lip 12a. The rim 12 is one piece as shown but may be welded on a steel wheel (not shown) to the perimeter of the wheel disk 18 so as to circumscribe the wheel disk 18, and a number of recesses, or turbine openings 16a, through the wheel disk 18 by which a corresponding number of spokes, spiders, or webs 14a are formed. The wheel 11 may be formed from any suitable material, including steel, magnesium and aluminum. The composite wheel 10 further includes an overlay 20 and a hub cover 13. The overlay 20 is generally annular-shaped, having a central opening 26 to allow access to a center hub 15 of the wheel 11. The overlay 20 includes a number of turbine openings 16b and webs 14b which correspond to the turbine openings 16a and webs 14a in the wheel disk 18 of the wheel 11.

Figures 2, 3:
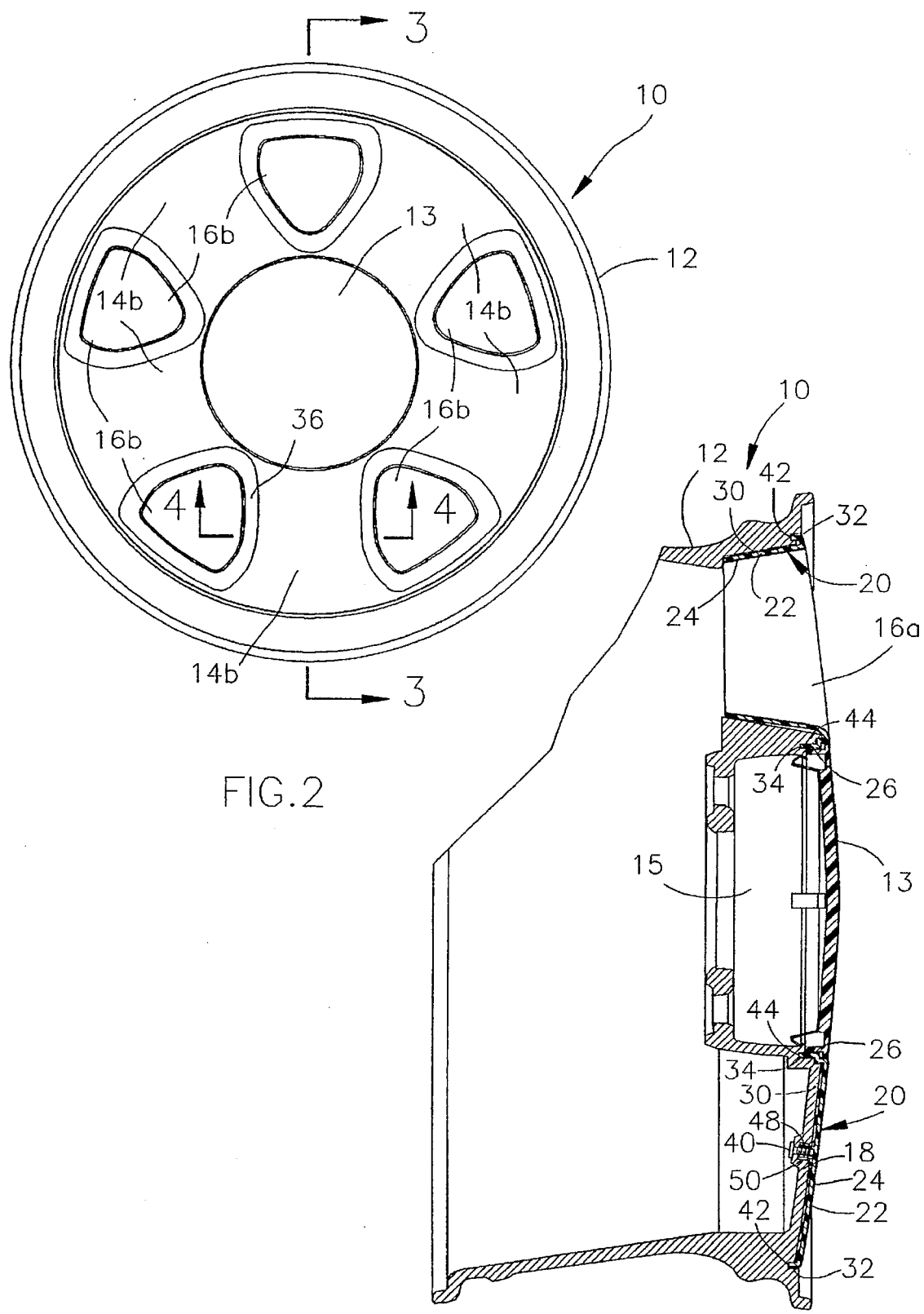
FIG. 2 is a side view of the composite wheel of FIG. 1.
FIG. 3 is a cross-sectional view of the composite wheel along line 3—3 of FIG. 2.

As illustrated in FIG. 3, the overlay 20 is preferably a thin gauge panel which is adhered directly to the outboard surface of the wheel disk 18. Moreover, the overlay 20 corresponds very closely to the contours of the wheel disk 18. In particular, the webs 14b and turbine openings 16b of the overlay 20 closely conform to the webs 14a and turbine openings 16a of the wheel 11, respectively, such that the overlay 20 appears to be integrally formed with the wheel 11. As such, the wheel 11 defines the structural configuration and styling of the composite wheel 10, while the overlay 20 provides the visible ornamental effect. In effect, the wheel 11 retains its own aesthetic identity, a particular advantage when the wheel is a commercially popular style, such as a cast aluminum wheel.

As seen in FIG. 3, the overlay 20 is preferably formed with radially outward and inward, axially-extending flanges 32 and 34, respectively, which are received in recesses 42 and 44, respectively, in the surface of the wheel disk 18. The flanges 32 and 34 and recesses 42 and 44 cooperate to provide a uniform transition from the overlay 20 to the outboard surface of the wheel disk 18, thereby giving the appearance of a unitary construction. In addition, the overlay 20 may be provided with a number of bosses 48, one of which is located at each web 14b. Each boss 48 closely engages a corresponding recess 50 formed in the surface of the wheel disk 18. As shown in FIG. 3, the boss 48 and recess 50 can be secured in cooperative engagement by a fastener 40, though an adhesive could be used in place of the fastener 40.

The bosses 48 and recesses 50 preferably perform two functions. First, two of the bosses 48 serve to locate the overlay 20 in the plane of the wheel disk 18 relative to the center of the wheel disk. Second, the depth of each recess 50 and the length of each boss 48 determine the axial location of the overlay 20 relative to the outer surface of the wheel disk 18. As a result, the overlay 20 can be accurately positioned on the wheel disk 18. However, one skilled in the art will recognize alternative methods to locating the overlay 20 relative to the wheel disk 18, and the teachings of the present invention are not limited to the above method.

Figure 4:
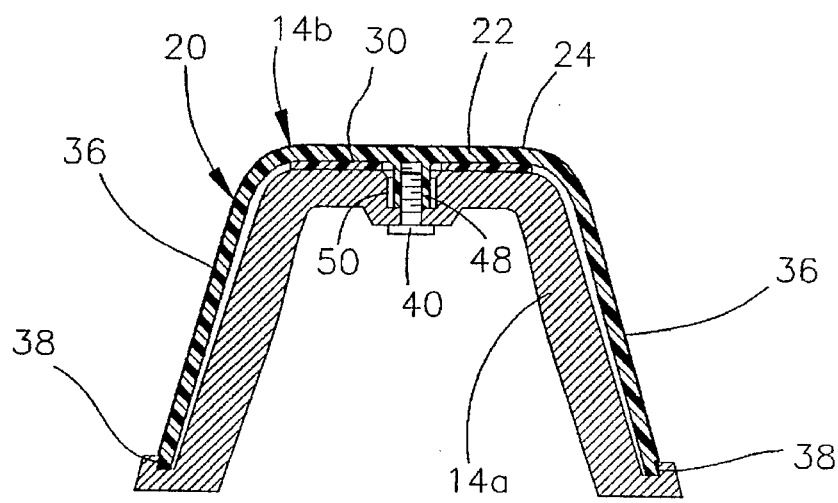
FIG. 4 is a cross-sectional view of the composite wheel along line 4—4 of FIG. 2.

FIG. 4 illustrates the conformance of the overlay 20 with the webs 14a of the wheel 11. The overlay 20 includes side portions 36 which extend axially into the turbine openings 16a of the wheel 11. In the preferred embodiment, the ends of the side portions 36 are received in recesses 38 which serve to better secure the overlay 20 within the turbine openings 16a. However, this tongue-in-groove design can be replaced with intermittent tabs (not shown) which are received in individual slots (not shown) to assist in locating the overlay 20 on the wheel disk 18.

The overlay 20 is preferably formed from a thin ABS-modified polycarbonate panel 22 formed by injection molding, though other molding techniques are acceptable. The panel 22 is preferably between about 2 and about 4 millimeters thick to readily blend with the surrounding surface of the wheel disk 18 while affording sufficient strength to the overlay 20, though one skilled in the art will recognize that greater and lesser thicknesses will often be acceptable. As can be seen from FIGS. 3 and 4, the overlay's shape and size is specifically designed to correspond to the surface of the wheel 11 to permit the wheel 11 to define the styling of the composite wheel 10. In that the overlay 20 is not required to be axially spaced from the surface of the wheel 11, maximum design flexibility can be achieved. The overlay 20 can be permanently adhered directly to the outboard surface of the wheel 11 by a suitable adhesive 30, such as a silicone or polyurethane adhesive, to form a permanent wheel.

In the preferred embodiment, the overlay 20 is plated with a suitable decorative treatment, such as a chromium plating 24. Ideally, the chromium plating 24 is electroplated to the panel 22 such that the overlay 20 is lightweight and has a superior chromium plating-to-plastic bond adhesion. A preferred electroplating process is disclosed in U.S. patent application Ser. No. 07/617,497, filed Nov. 23, 1990, entitled "Method for Electroplating High-Impact Plastics", and assigned to the assignee of the present invention. The method forms an electroplated ABS-modified polycarbonate article suitable for use in applications which require good impact resistance such as in automotive component applications, wherein the adhesion between an ABS-modified polycarbonate substrate and an electroplated metal is exceptional such that upon impact, the metal plating adheres well without chipping, cracking or delamination from the substrate. In addition, the adhesion between the metal plating and the substrate is highly resistant to temperature and corrosion. While an ABS-modified polycarbonate material is preferred, those skilled in the art will recognize that other polymer materials can also be used, such as unmodified polycarbonate, unmodified ABS, nylon-polycarbonate, polyurethane, and butadiene-loaded ABS.

In general, the preferred method for forming the chromium plating 24 on the panel 22 is to chemically pretreat or condition an ABS-modified polycarbonate substrate, etch with an acidic solution, electrolessly plate a layer of metal strike, and finally electrochemically deposit the desired chromium plating 24 onto the metal strike. The ABS-modified polycarbonate is a polycarbonate substrate which has been modified with up to about 50 percent by weight of ABS and more preferably between about 15 to about 40 percent by weight.

The chromium-plated overlay 20 formed according to the preferred method is characterized as having a uniform chromium plating 24 which adheres well to the panel 22 due to the better surface finish obtainable with plastics as compared to cast aluminum. As previously noted, the porosity of aluminum necessitates that an aluminum surface be machined to "close" the exposed pores in order to form an adherent plating surface. Current machining technology severely limits the ability to obtain a suitable surface quality for plating in such recesses as the turbine openings 16a and 16b. This limitation is further complicated by the fact that variations in current density during electroplating causes uneven plating thicknesses in such deep recesses as the turbine openings 16a and 16b. Furthermore, aluminum inherently exhibits variations in surface hardness which preventing the aluminum from being machined to a finish comparable to plastic.

In contrast, the overlay 20 of the present invention can be formed to provide a surface finish that readily adheres the chromium plating 24, such that the overlay is highly resistance to impact, corrosion and temperature. The improved adhesion resists delamination from chemical attack by corrosive environments, and particularly the corrosion tests used by automotive manufacturers for purposes of qualifying metal-plated articles for original equipment use. In addition, the overlay 20 is capable of withstanding high temperatures found at the surface of the wheel 11. As a result, the overlay 20 can be adhered directly to the surface of the wheel 11, as shown in FIG. 3, without the need to space or insulate the chromium plating 24 from the surface of the wheel 11 to avoid the elevated temperatures associated therewith.

Figure 5:
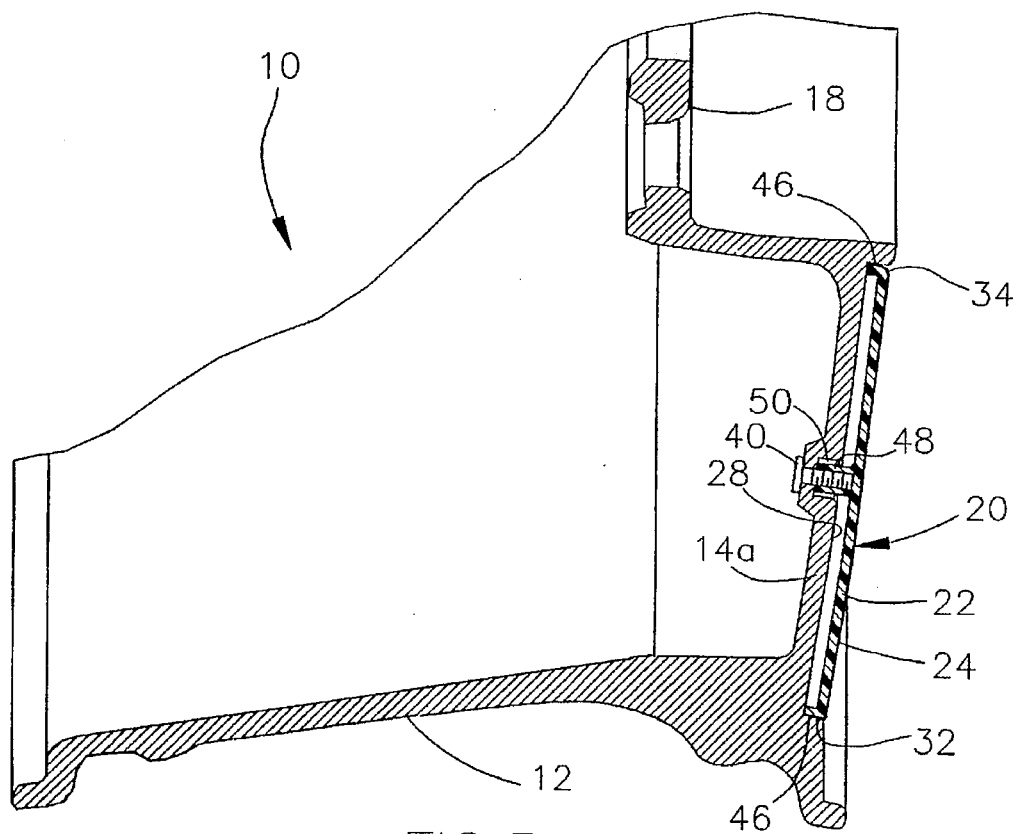
FIG. 5 is a cross-sectional view of a composite wheel in accordance with a second embodiment of this invention.

A second embodiment of the present invention is illustrated in FIG. 5, wherein the overlay 20 is spaced from the outboard surface of the wheel disk 18, yet is secured to the wheel disk 18 with the fastener 40 as described in the preferred embodiment. The fastener 40 is disposed within a recess 28 formed in the web 14a of the wheel disk 18, and the fastener 40 extends through the boss 48 and recess to secure the overlay 20 to the wheel 11. The radially inward and outward flanges 34 and 32 are formed to have extended flanges 46 which abut the bottom of the recess 28. The recess advantageously reduces the weight of the wheel 11, while permitting only limited flexing of the overlay 20 relative to the wheel disk 18. Otherwise, the basic teachings of the preferred embodiment are the same, with the overlay 20 being able to closely conform to the contours of the wheel 11, including the turbine openings 16a. The overlay 20 is in intimate contact; with the wheel disk 18 at the radially outward and inward flanges 32 and 34 without concern for temperature effects, while the chromium plating 24 is substantially flush with the surface of the wheel disk 18 to give the appearance of a unitary wheel. Accordingly, the overlay 20 of the second embodiment appears to be the outboard surface of the wheel 11 and not an additional attachment.

A significant advantage of the composite wheel 10 of the present invention is that the overlay 20 can provide an aesthetically pleasing, permanently attached ornamental cover to the wheel 11 without the appearance of being a separately manufactured attachment to the wheel 11. The overlay 20 closely conforms to the contours of the wheel 11 such that the chromium plating 24 appears to be deposited directly on the wheel disk 18 of the wheel 11. As a result, the aesthetic styling and appeal of the composite wheel 10 is established by the wheel 11, whereas the overlay 20 contributes the reflective effect to the composite wheel 10. The overlay 20 is permanently attached to the wheel 11 and does not appear to be an attachment to the wheel 11, such that the overlay 20 is not as susceptible to theft or accidental detachment as are prior art overlays and conventional wheel covers. Moreover, because the overlay 20 conforms closely to the wheel 11, the overlay 20 has a low profile such that the composite wheel 10 can be readily mounted and removed without the overlay 20 being a hindrance.

In terms of aesthetics and styling, the overlay 20 is preferably formed to closely conform to the contours of the wheel 11, such as the webs 14a and turbine openings 16a illustrated. The good adhesion between the chromium plating 24 and the panel 22 permits the overlay 20 to have intimate contact with the wheel 11, which facilitates the close conformity desired between the overlay 20 and the wheel 11. The panel 22 is adhesively bonded directly to the outboard surface of the wheel 11 either with a suitable adhesive 30 as shown, or in any other suitable manner.

Again, the adhesion between the chromium plating 24 and the panel 22 exhibits extremely good resistance to high temperatures such that no insulating layer of foam is necessary between the chromium plating 24 of the overlay 20 and the wheel 11, such as that specifically recited by the prior art. This permits the overlay 20 to be formed as the panel 22 which has a low profile and, therefore, does not extend axially outward from the surface of the wheel disk 18 to any significant degree. As a result, the prestigious appeal of a cast aluminum wheel can be maintained because the wheel 11 defines the outward shape and styling of the composite wheel 10 while the overlay 20 provides the aesthetically-pleasing reflective appearance. Design flexibility of the composite wheel 10 is then optimized because the overlay 20 does not pose any significant design limitations to the styling of the composite wheel 10. The chromium plating 24 can be provided near the center hub 15 and deep within the recesses 16b without concern for high temperatures, improving the appearance and durability of the chromium plating 24.

Another significant advantage of the present invention is that the overlay 20 can cover substantially the entire exposed surface of a cast aluminum wheel, including the deep recesses 16a in the surface of the wheel, because the porosity of the cast aluminum wheel is not a factor in the adhesive strength of the chromium plating 24. Whereas cast aluminum wheel of the prior art were either limited as to the coverage of the chromium plating 24 or were highly susceptible to corrosion and delamination, the overlay 20 of the present invention is able to follow the contours of the wheel 11, even such features as the turbine openings 16a and 16b.

While allowing the entire outboard surface of the wheel 11 to have a chrome-plated finish, the overlay 20 of the present invention adds typically less than one pound of weight to the composite wheel 10, in contrast to the typical two to three pounds added when a metal plating is deposited directly on the wheel 11 itself. The weight of the composite wheel 10 can be further reduced by optimizing the structure of the wheel 11 hidden beneath the overlay 20, as illustrated in FIG. 5. The plating and material costs according to the teachings of the present invention are also significantly less than that for directly plating a wheel.

Finally, the adhesion between the chromium plating 24 and the panel 22 is particularly resistant to the temperatures and the corrosive environment associated with automotive applications. Corrosion tests are such as to permit its use as an original equipment item sold by automobile manufacturers. Further, as previously noted, the adhesion between the chromium plating 24 and the panel 22 is sufficient such that the panel 22 need not be spaced away from the surface of the wheel disk 18, nor is there a need for an insulating layer of foam between the panel 22 and the wheel disk 18. Design flexibility of the composite wheel 10 can be maximized because the overlay 20 does not pose any significant styling limitations to the composite wheel 10 as a consequence of needing to design around the high temperature areas of the wheel 11.

Accordingly, the present invention provides a composite wheel which incorporates an overlay that is permanently secured directly to the surface of the wheel such that the overlay appears to be the surface of the wheel and not a separate attachment. As a result, a decorative finish on the overlay appears to be formed on the wheel itself. This is particularly advantageous with hard-to-plate wheel materials, such as cast aluminum. Accordingly, optimization of a wheel's design and styling can be achieved independent of plating limitations.

While the invention has been described in terms of a preferred embodiment, it is apparent that other forms could be adopted by one skilled in the art. Accordingly, the scope of the invention is to be limited only by the following claims.

What is claimed is:

1. An overlay for a composite decorative vehicle wheel, said wheel having a web portion and a peripheral rim portion for mounting a vehicle tire, said peripheral rim portion defining an axial peripheral lip circumscribing said rim portion and structural means interconnecting said web portion and said peripheral rim portion, said web portion and said peripheral rim portion defining a wheel face outer surface and a central axis, said overlay comprising:

an ornamental panel member covering said entire wheel face outer surface and not covering said axial peripheral lip, said ornamental panel member having a substantially uniform thickness; a first outboard surface; and an oppositely disposed second inboard surface, at least a portion of said second inboard surface of said ornamental panel member being juxtaposed a portion of said wheel face outer surface such that at least a portion of said first outboard surface of said ornamental panel member substantially conforms to said portion of said wheel face outer surface;

a decorative layer adhered to said first outboard surface of said ornamental panel member; and an adhesive disposed between said ornamental panel member and said wheel face outer surface, said adhesive attaching said overlay directly to said wheel face outer surface;

whereby said decorative layer of said at least a portion of said first outboard surface substantially conforms with said portion of said wheel face outer surface such that said decorative layer readily blends with said axial peripheral lip circumscribing said peripheral rim portion so as to provide a visible impression that said decorative layer is essentially flush with said wheel face outer surface.

2. The overlay of claim 1 wherein said portion of said wheel face outer surface is contoured and said at least a portion of said first outboard surface of said ornamental panel member is correspondingly contoured so as to closely conform to said portion of said wheel face outer surface.

3. The overlay of claim 1 wherein said ornamental panel member is a plastic member having an axial thickness of no more than about four millimeters.

4. The overlay of claim 1 wherein said overlay is attached to said wheel by said adhesive disposed along said portion of said wheel face outer surface.

5. An overlay for a composite decorative vehicle wheel, said wheel having a web portion and a peripheral rim portion for mounting a vehicle tire, said peripheral rim portion defining an axial peripheral lip circumscribing said peripheral rim portion and structural means interconnecting said web portion and said peripheral rim portion, said web portion and said peripheral rim portion defining a wheel face outer surface and central axis, said overlay comprising:

an ornamental panel member covering said entire wheel face outer surface and not covering said axial peripheral lip, said ornamental panel member having a substantially uniform thickness; a first outboard surface; and an oppositely disposed second inboard surface, at least a portion of said second inboard surface of said ornamental panel member being juxtaposed a portion of said wheel face outer surface such that said at least a portion of said first outboard surface of said ornamental panel member substantially corresponds to said portion of said wheel face outer surface;

a metal layer electrochemically plated onto said first outboard surface of said ornamental panel member; and an adhesive disposed between said ornamental panel member and said wheel face outer surface, said adhesive attaching said overlay directly to said wheel face outer surface;

whereby when said overlay is attached directly to said wheel face outer surface by said adhesive, said metal layer of said at least a portion of said first outboard surface of said overlay substantially conforms with said juxtaposed portion of said wheel face outer surface such that said metal layer readily blends with said axial peripheral lip circumscribing said peripheral rim portion of said wheel so as to provide a visible impression that said metal layer is essentially flush with said wheel face outer surface.

6. The overlay of claim 5 wherein said portion of said outer surface is contoured and said at least a portion of said first outboard surface of said ornamental panel member is correspondingly contoured so as to closely conform to said portion of said wheel face outer surface.

7. The overlay of claim 5 wherein said ornamental panel member is a plastic member having an axial thickness of no more than about four millimeters.

8. The overlay of claim 6 wherein said overlay is attached to said wheel by said adhesive disposed on said wheel face outer surface.

9. The overlay of claim 5 wherein said metal layer is a chromium plated layer.

10. The overlay of claim 6 wherein said wheel face outer surface has a plurality of locating recesses and wherein said overlay further comprises a corresponding plurality of locating bosses which mate with said plurality of locating recesses to locate and lock said overlay axially relative to said wheel face outer surface and within the plane of said wheel face outer surface.

11. A composite vehicle wheel having an ornamental cover, said composite vehicle wheel comprising:

a wheel having a web portion and a peripheral rim portion circumscribing said web portion for mounting a vehicle tire, said peripheral rim portion defining an axial peripheral lip circumscribing said peripheral rim portion and structural means interconnecting said web portion and said peripheral rim portion defining an axially outwardly partly convexly contoured wheel face having an outboard surface; and an overlay attached to said web portion and extending to said axial peripheral lip circumscribing said peripheral rim portion of said wheel, said overlay comprising:

an ornamental panel member covering said entire wheel face outboard surface and not covering said axial peripheral lip, said ornamental panel member having a substantially uniform thickness a first outboard surface; and an oppositely disposed second inboard surface juxtaposed a portion of said outboard surface of said wheel face, at least a portion of said first outboard surface closely and uniformly conforming to said portion of said outboard surface of said wheel face;

a decorative layer adhered to said first outboard surface of said ornamental panel member; and an adhesive disposed between said ornamental panel member and said outboard surface of said wheel face, said adhesive attaching said overlay directly to said outboard surface of said wheel face;

whereby when said overlay is attached directly to said outboard surface of said web portion of said wheel face by said adhesive at least a portion of said decorative layer of said first outboard surface substantially conforms with said outboard surface of said wheel face such that said decorative layer readily blends with said axial peripheral lip circumscribing said peripheral rim portion so as to provide a visible impression that said decorative layer is essentially flush with said outboard surface of the wheel face.

12. The composite vehicle wheel of claim 11 wherein said portion of said outboard surface of said wheel face is contoured and said at least a portion of said first outboard surface of said ornamental panel member is correspondingly contoured so as to closely conform to said portion of said outboard surface of said wheels face.

13. The composite vehicle wheel of claim 11 wherein said ornamental panel member is a plastic member having an axial thickness of no more than about four millimeters.

14. The composite vehicle wheel of claim 11 wherein said overlay is attached to said web portion of said outboard surface of said wheel face by said adhesive disposed along said portion of said outboard surface of said wheel.

15. The overlay of claim 11 wherein said decorative layer is a chrome plate layer.

16. In a composite vehicle wheel having a wheel with a web portion and a peripheral rim portion circumscribing said web portion for mounting a vehicle tire, said peripheral rim portion defining an axial peripheral lip circumscribing said peripheral rim portion and structural means interconnecting said web portion and said peripheral rim portion, said web portion and said peripheral rim portion defining an axially outwardly partly convexly contoured wheel face having an outboard surface, an ornamental panel member covering said entire outboard surface of said wheel face and not covering said axial peripheral lip, said ornamental panel member being attached to said outboard surface of said wheel face, said ornamental panel member having a first outboard surface and an oppositely disposed second inboard surface, a portion of said second inboard surface juxtaposed a portion of said outboard surface of said wheel face, the improvement comprising:

an adhesive disposed between said ornamental panel member and said outboard surface of said wheel face, said adhesive attaching said ornamental panel member directly to said outboard surface of said wheel face;

a decorative layer adhered to said first outboard surface of said ornamental panel member;

said ornamental panel member being a thin panel of substantially uniform thickness; and said first outboard surface having at least a portion closely conforming to an adjacent portion of said outboard surface of said wheel face;

whereby when said ornamental panel member is directly attached to said outboard surface of said wheel face by said adhesive at said portion of said second inboard surface, said decorative layer of said portion of said first outboard surface substantially conforms with said adjacent portion of said outboard surface of said wheel face such that said decorative layer readily blends with said axial peripheral lip circumscribing said peripheral rim portion so as to provide a visible impression that said decorative layer is essentially flush with said outboard surface of said wheel face.

* * * * *